(12) United States Patent
Polcha et al.

(10) Patent No.: US 7,844,718 B2
(45) Date of Patent: Nov. 30, 2010

(54) SYSTEM AND METHOD FOR AUTOMATICALLY CONFIGURING REMOTE COMPUTER

(76) Inventors: Andrew J. Polcha, 12462 Cabin Spring La., Lovettsville, VA (US) 20180;
Michael P. Polcha, 12462 Cabin Spring La., Lovettsville, VA (US) 20180

( * ) Notice: Subject to any disclaimer, the term of this patent is extended or adjusted under 35 U.S.C. 154(b) by 797 days.

(21) Appl. No.: 11/709,355

(22) Filed: Feb. 22, 2007

(65) Prior Publication Data
US 2008/0034200 A1 Feb. 7, 2008

Related U.S. Application Data

(63) Continuation of application No. 10/321,722, filed on Dec. 18, 2002, now abandoned.

(60) Provisional application No. 60/426,341, filed on Nov. 15, 2002, provisional application No. 60/379,757, filed on May 14, 2002.

(51) Int. Cl.
*G06F 15/16* (2006.01)
(52) U.S. Cl. .......................... 709/229; 709/227; 726/5; 726/15
(58) Field of Classification Search .................. 709/220, 709/221, 222, 227, 229; 726/2, 3, 5, 15; 717/176–178
See application file for complete search history.

(56) References Cited

U.S. PATENT DOCUMENTS

| 6,092,200 | A   | * | 7/2000  | Muniyappa et al. | 726/15  |
|-----------|-----|---|---------|------------------|---------|
| 6,378,128 | B1  | * | 4/2002  | Edelstein et al. | 717/174 |
| 6,496,858 | B1  | * | 12/2002 | Frailong et al.  | 709/221 |
| 6,598,057 | B1  | * | 7/2003  | Synnestvedt et al. | 707/200 |
| 6,735,766 | B1  | * | 5/2004  | Chamberlain et al. | 717/173 |
| 6,751,729 | B1  | * | 6/2004  | Giniger et al.   | 713/153 |
| 6,839,759 | B2  | * | 1/2005  | Larson et al.    | 709/228 |
| 2003/0208609 | A1 | * | 11/2003 | Brusca         | 709/230 |
| 2003/0236865 | A1 | * | 12/2003 | Anthe et al.   | 709/220 |

OTHER PUBLICATIONS

Kelly, Mike, "Gain Control of Application Setup and Maintenance with the New Windows Installer," Microsoft Systems Journal, pp. 1-15, Sep. 1998.*

* cited by examiner

*Primary Examiner*—Yemane Mesfin
(74) *Attorney, Agent, or Firm*—Doster Greene, LLC.

(57) ABSTRACT

A system and method for automatically configuring a remote computer to establish a VPN connection with a network is disclosed. According to the system and method, a configuration generator determines information necessary for the remote computer to establish the VPN connection, and generate an executable file to be run the remote computer. When run on the remote computer, the executable file automatically updates the remote computer's configuration settings so as to enable it to establish the connection with the network. The information required by the configuration generator can either be extracted from a database automatically, or can be keyed in by a network administrator.

20 Claims, 9 Drawing Sheets

SYSTEM AND METHOD FOR AUTOMATICALLY CONFIGURING REMOTE COMPUTER

This application is a Continuation of prior application Ser. No. 10/321,722, filed Dec. 18, 2002 now abandoned, and claims Priority of Provisional Application Ser. No. 60/379,757 filed May 14, 2002 and Provisional Application Ser. No. 60/426,341 filed Nov. 15, 2002 is claimed under 35 U.S.C. 119(e), the entire disclosure of which is incorporated herein by reference.

BACKGROUND OF THE INVENTION

1. Field of the Invention

The present invention relates to remote computer configuration, and more particularly to a system and method for automatically configuring a remote computer for establishing a virtual private network (VPN).

2. Background of the Related Art

A Virtual Private Network (VPN) is a secure communication channel established between computers over a shared public network. In most instances, the VPN connects a remote user's computer (sometimes referred to as the caller) with a local host computer (sometimes referred to as the callee) over the Internet. Thus, for example, a user's home computer can be connected to a local area network (LAN) at the user's place of employment. Before such a connection can be established, however, the user's home computer and the LAN need to be properly configured for the remote connection.

Referring to FIG. 1, a structure of a related art VPN is shown. Referring to FIG. 1, a LAN includes at least one server 100 having various local user computers 100-1 ~100-N connected thereto. Additionally, the server 100 is coupled to a gateway/router 120 to access the Internet 130. The gateway/router 120 allows for two-way communication between the server 100 and the Internet 130. Additionally, the gateway/router 120 can also be coupled to an Internet service provider (ISP) 150.

At least one remote computer 140-1 is also coupled to the Internet 130. The remote user 140-1 can connect to the Internet 130 using its own ISP 150. When the remote user 140-1 and the gateway/router 120 are properly configured, the remote computer 140-1 can establish a secure connection through the Internet 130 to the gateway/router 120. The VPN connection is thus established. Once the VPN connection is established, the remote computer 140-1 is seen by the server 100 as another local user connected to the server 100. For example, the remote computer 140-1 would be present in the network neighborhood administered by the server 100. Any number of remote users could access the gateway/router 120 through the Internet 130, depending on the configuration of the gateway/router 120.

Before a VPN connection can be established between the remote computer 140-1 and the server 100, however, the remote computer 140-1 and the gateway/router 120 need to be properly configured. For example, the remote computer 140-1 needs to be given the proper network address to the gateway/router 120, and needs to know how to access the server 100. For example, various client services must be installed and configured on the remote computer to access the server. The procedure for accessing the server 100 could include, for example, knowing proper user names and passwords.

A network administrator operating the LAN is typically required to configure both the gateway/router 120 and the remote computer 140-1. Because the gateway/router 120 is typically co-located with the LAN, and is also remotely accessible by using prescribed TELNET commands, the network administrator supporting the LAN can easily access the gateway/router 120 (being an Internet device) so as to properly configure it. However, most remote computers are, by definition, not co-located with the LAN 100. Therefore, these computers are most often not remotely accessible to be remotely configured.

Accordingly, a problem with a related art VPN is that a network administrator needs to individually configure each remote computer so that the user will be able to access the LAN. This may require that the network administrator physically visit the remote location where the remote computer is, or alternatively may require that a remote user bring the remote computer to the network administrator. This can be very inconvenient and cause delay in configuring the remote computer. Additionally, when establishing the connection between the remote computer 140-1 and the server 100, a remote user may be required to first access the remote user's Internet service provider, next access the gateway/router, and then access the LAN. Accordingly, there can be up to three levels of authentication that need to be traversed by the remote user to gain access to the LAN. This can be difficult for some users to properly navigate.

One solution to this problem is to provide an HTML wizard that can provide instructions for a user to follow to configure a computer for remote access. However, because of the complexity of properly configuring a remote computer for access, this method can prove ineffective. Additionally, even with the instructions, the process of configuring the remote computer can still be time-consuming. Finally, a user following the instructions of the wizard may still enter erroneous data, thus requiring a network administrator to first undo the mistake and then reconfigure the computer for remote access.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide a system and method for configuring a remote computer for access to a VPN by generating an executable code to be run on the remote computer that configures the remote computer.

It is another object of the present invention to provide a system and method for automatically configuring a remote computer to access a VPN by e-mailing an executable program to the remote user which, when executed, properly sets the required parameters to establish the VPN connection.

It is another object of the present invention to provide a system and method for automatically configuring a remote computer to access a VPN by generating an executable program that configures a computer to access an ISP, access a gateway/router, and login to a LAN by selecting a single program icon.

It is another object of the present invention to provide a system and method for remotely configuring an operating system of a remote computer by generating an executable file that, when executed, manipulates registry entries of the remote computer according to requirements of the user of the remote computer.

According to the preferred embodiment, a compiler module is provided to generate an executable program that can be run on a remote computer to configure the remote computer to establish a VPN connection to the host computer. The compiler module uses various information regarding the local/host computer to generate the executable file that will configure the remote computer. For example, the compiler module uses information on the WAN profile of the network/LAN, the primary and secondary DNS of the local computer, and the primary and secondary WINS address of the local computer. Additionally, the compiler module uses the type of network configuration (client services), such as Microsoft or Novell, as well as the configuration of the server (for example, as domain controller or server). Next, the gateway address of the local computer is also provided to the compiler module.

In the preferred embodiment, no information regarding the remote computer is necessary to generate the executable file. Specifically, the executable file will first determine the necessary information regarding the remote computer when it is executed on the remote computer, and then will use that information to properly configure the remote computer. However, it would also be possible to provide the configuration module with information regarding the operating system that the remote user has installed on the remote computer. By doing this, it may be possible to streamline the executable file that will eventually be delivered to the remote computer. That is, the executable file will already be tailored for the remote computer.

It is to be understood that any method can be used to provide the necessary information to the compiler module. In one embodiment, a system information front end module is provided to prompt the network administrator to provide the necessary information. The system information module then saves this information in a prescribed format to be used by the compiler module. In another embodiment, the necessary information is extracted from a database into which the information has previously been stored.

Using the information, the compiler module generates an executable file including all of the parameters in a prescribed format. These parameters include client, adapter, protocol, and service. When run on a remote computer, the executable program configures the operating system with the settings necessary to establish a VPN connection to the local/host network. Thus, it loads the client, adapter, protocol, and service. According to the preferred embodiment, the protocol is TCP/IP and the services file and printer sharing, which is turned on. In the preferred embodiment, the RAS phonebook of the Windows operating system is configured. Alternatively, registry entries can be directly manipulated by this executable program. The executable file can either be e-mailed to the remote user or can be downloaded from a Web site. It should be understood that any method of providing this information to the remote user could be used, such as saving it to a disk that is sent to the remote user. To provide an additional layer of security, the executable file could be password protected such that the executable program would not run on the remote computer unless a prescribed password is provided upon executing the program. By doing this, if the executable program is intercepted by an unintended recipient, the unintended recipient cannot gain access to the network because the executable program will not run without the password.

Additional information regarding the user can also be provided depending on the level of service that is intended to be provided to the user. For example, an automatic dialing program can be implemented in the executable program using the user's login and password information. Moreover, automatic login information for the network can also be provided. When this additional user information is provided, after the executable configuration program is run on the remote computer, the remote user is given a single program to run (that is, a single icon to click), which will connect to and login to the host network. This single program is preferably a dialer program. Alternatively, the compiler module could generate both a configuration program and a separate dialer program.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
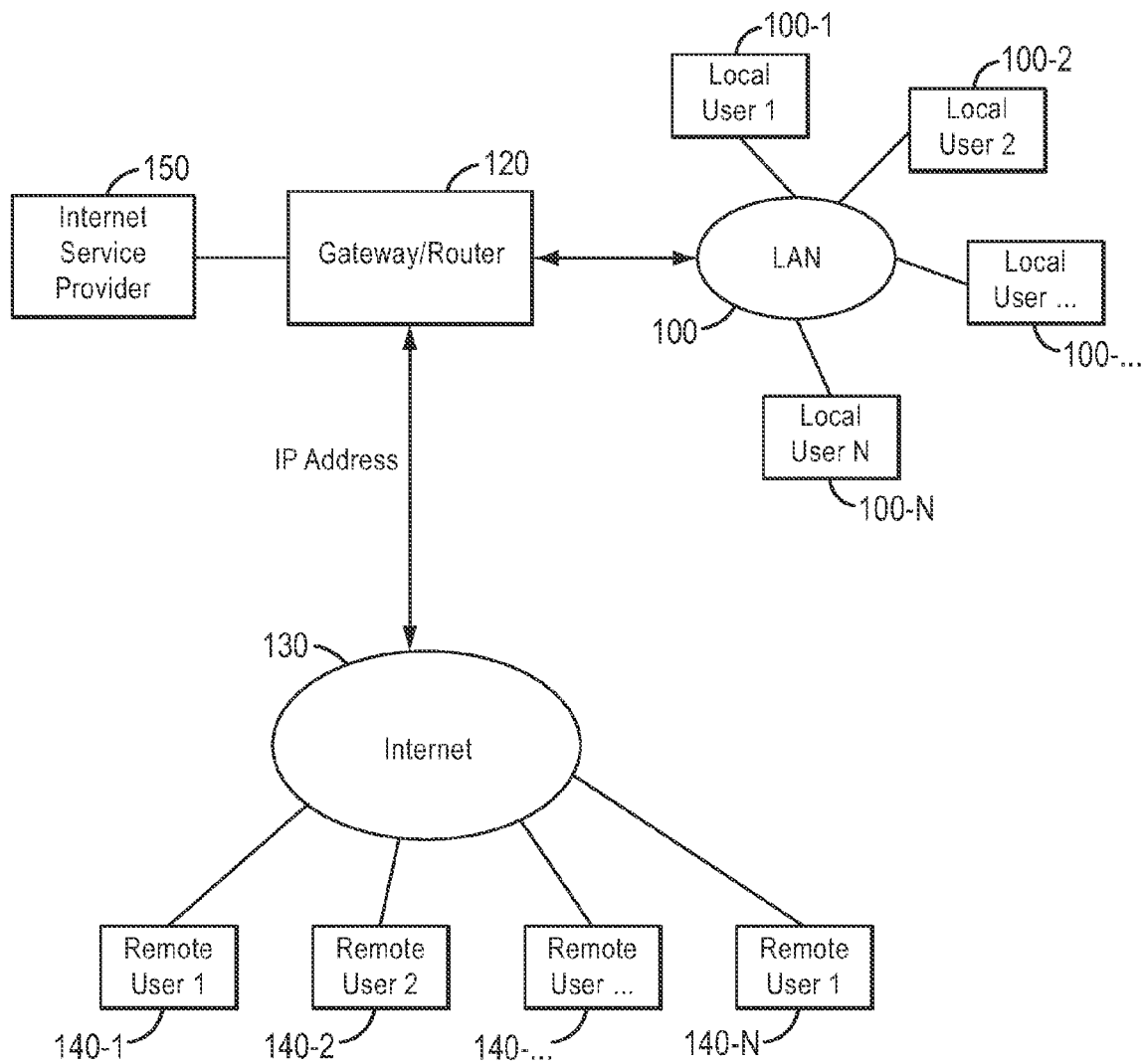
FIG. 1 shows a related art network configuration.

The system and method of automatically configuring a remote computer to establish a VPN connection to a local computer preferably collects information about the remote computer, collects information about the local area network (LAN) and its associated gateway/router, and collects information regarding login and authentication procedures for the LAN and/or gateway/router. Using this information, at least one executable file is preferably generated for execution on the remote computer. The executable file is designed to configure the remote computer to establish a VPN connection to the LAN through the gateway/router. In the preferred embodiment, the executable file manipulates the remote computer's registry information, such as the Remote Access Service (RAS). Additionally, and the preferred embodiment, the VPN connection is a client to gateway connection. That is, the remote computer is able to itself connect to the gateway of the local computer.

In order to collect the information needed to generate the executable file, the preferred embodiment uses a configuration program generator, which can be hardware, firmware, software, or any combination thereof. Preferably, the configuration program generator is made up of at least one or more software modules. Thus, referring to FIG. 3, the configuration program generator preferably includes at least two modules. A first module collects information regarding the local computer (for example, the LAN server), the remote computer (for example, a PC), and user information for the operator of the remote computer. This module is referred to as the information collection module 2010.

A second module uses the information collected by the system information module to generate the executable file. This module is referred to as the compiler module 2020. The executable file is then preferably deployed by any manner, for example by e-mail, to the remote computer for execution.

As stated above, the configuration program generator is preferably software that would be run on a computer operated by the network administrator. This computer may be the server, or can be any other computer operated by the administrator. Additionally, the configuration program generator software could have any type of graphic user interface, or none at all. For example, in operation, the configuration program generator could be displayed as one or more dialog boxes. The dialog boxes could prompt the network administrator for information, or can be pre-populated with relevant information if the configuration program generator is associated with a database that has the necessary information for each potential remote user. Alternatively, if the configuration program generator is associated with such a database, it would be possible to implement the software with no graphical user interface.

Thus, in one embodiment, the network administrator could be provided with a great deal of control over the configuration program generator by having relevant information automatically retrieved from the database, and information input fields in various dialog boxes automatically populated with the retrieved information. The retrieved information would be information necessary to generate the executable file for any given remote user. In this case, one or more dialog boxes could be initially presented having blank/empty text fields corresponding to the various information necessary to establish the VPN connection. Upon receiving an instruction from the network administrator, the relevant information could be retrieved from the database and directly inserted into the corresponding text boxes. The network administrator would thus have the opportunity to review and/or change the information in the text boxes prior to causing the configuration program generator to generate the executable file.

Alternatively, if there is no associated database, the configuration program generator could prompt an administrator to manually enter the required information into the corresponding text boxes. In this case, similar dialog boxes would be presented having blank text boxes. The network administrator would then enter the necessary information manually. In this embodiment, the configuration program generator could be further configured to provide the manually entered information to a database for later use, in addition to generating the executable file.

In the preferred embodiment, however, the information collection module of the configuration program generator would transparently retrieve the necessary information directly from the database and pass it to the compiler module, without first displaying the information. The compiler module would then uses information to generate the executable file. A network administrator may optionally be given the opportunity to confirm the information retrieved from the database prior to generating the executable file, or to modify the information.

Regardless of how the information is provided, there is certain network information that is necessary to establish the VPN connection. This network information includes, for example, a WAN number, one or two DNS numbers, one or two WINS numbers, and the gateway IP address.

Using the network information (either provided manually by the administrator or automatically extracted from the database), the configuration program generator preferably generates an executable program that can be run on the remote computer. The executable program, when run on the remote computer, would configure the remote computer so that it can establish a VPN connection with the local computer network. It is preferable that the executable configuration program would update the registry settings of the remote computer or update the Windows settings. Depending on the operating system employed, various aspects of the registry and/or operating system data would be updated. Additionally, in a preferred embodiment, the executable file is encrypted prior to being deployed to the remote computer. In order to execute the executable file, the user of the remote computer would need to know the key to unlock the program. This would prevent unauthorized users from executing the program, and provides a layer of security.

Figure 2:
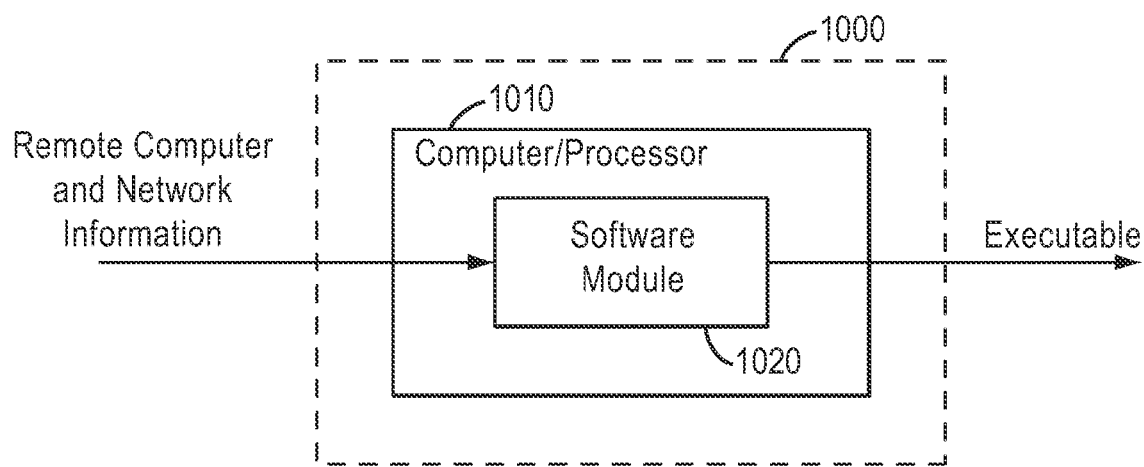
FIG. 2 illustrates a system for generating the executable remote configuration file according to the preferred embodiment.

Referring to FIG. 2, a conceptual view of the system for generating the executable remote configuration file is shown. The system preferably includes a computer/processor 1010 for executing commands to convert remote user information/network information into the executable file. The computer/processor 1010 preferably has loaded thereon the configuration program generator 1020, which is preferably a software module configured to receive the remote user information and/or network information and generate the executable remote configuration file.

The software may be written in standard programming language, compiled and linked into an executable program. For example, the software could be written in JavaScript, C++, PERL, and CGI. In the preferred embodiment, the software is one of an ActiveX or and OCX module, which can be linked to an application program such as Microsoft Access.

Additionally, it is possible to use scripting to cause the remote computer to execute certain procedures. If scripting is used, the script first passes to an interpreter of the remote computer. The interpreter, preferably Windows, executes the software script into a readable medium. It should be understood that any other interpreter could be used, including UNIX, LINUX, or HTML. Moreover, it should be understood that it is possible to write code to emulate certain mouse clicks and keystrokes. For example, to configure a remote computer having Windows 98, it may be beneficial to generate the executable file to emulate keystrokes and mouse clicks required to configure the system, instead of directly writing to the registry.

Additional details of how the executable file is generated will be described in a later section.

Figure 3:
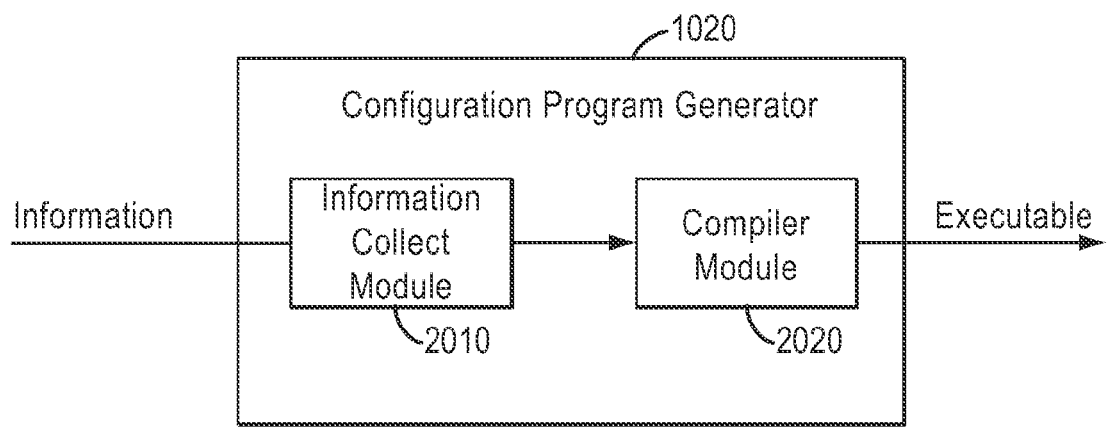
FIG. 3 illustrates a configuration program generator according to the preferred embodiment.

Referring to FIG. 3, additional detail of the configuration program generator 1020 is shown. The configuration program generator 1020 preferably includes an information collection module 2010 and a compiler module 2020.

The information collection module 2010 can be any software used to collect information needed by the compiler module to generate the executable remote configuration file. For example, in a very basic configuration, the information collection module could be an ASCII text comma separated document. In that case, the compiler module 2020 would preferably parse the information in the ASCII document to retrieve the necessary information for generating the executable remote configuration file.

Alternatively, the information collection module 2010 could be a database with or without a filter. Preferably, using the filter, only relevant information for a prescribed user would be provided from the database to the compiler module 2020. Alternatively, information for several users could be provided to compiler module 2020, so as to allow the compiler module 2020 to generate a plurality of executable files for each of the respective users. In either case, a network administrator could additionally review the information extracted from the database prior to transferring it to the compiler module 2020. Moreover, the network administrator could make changes to the data at that time. It should be understood that any method of compiling the database can be used.

Thus, in a first embodiment of the information collection module 2010, the network administrator enters the necessary information manually. Using this embodiment, no database is necessary. Rather, for each remote user for which a VPN connection will be configured, the relevant information is prided directly to the information collection module 2010 when the network administrator needs to generate the executable file. In a second embodiment, on the other hand, a database is required. The network administrator would preferably select an appropriate record from the database. The record would preferably includes all of the information necessary to generate the executable files. The network administrator would then simply run the compiler module directly from the database to generate the executable file based on the selected record. In this case, the information collection module 2010 could optionally include a verification module, displaying the information extracted from the database for the network administrator to verify prior to generating the executable file.

Regardless of the embodiment of the information collection module 2010, the compiler module 2020 uses the information collected to generate the executable program to be run on the remote computer. Additional details of the information collection module 2010 and the compiler module 2020 are provided hereinbelow.

Figure 4:
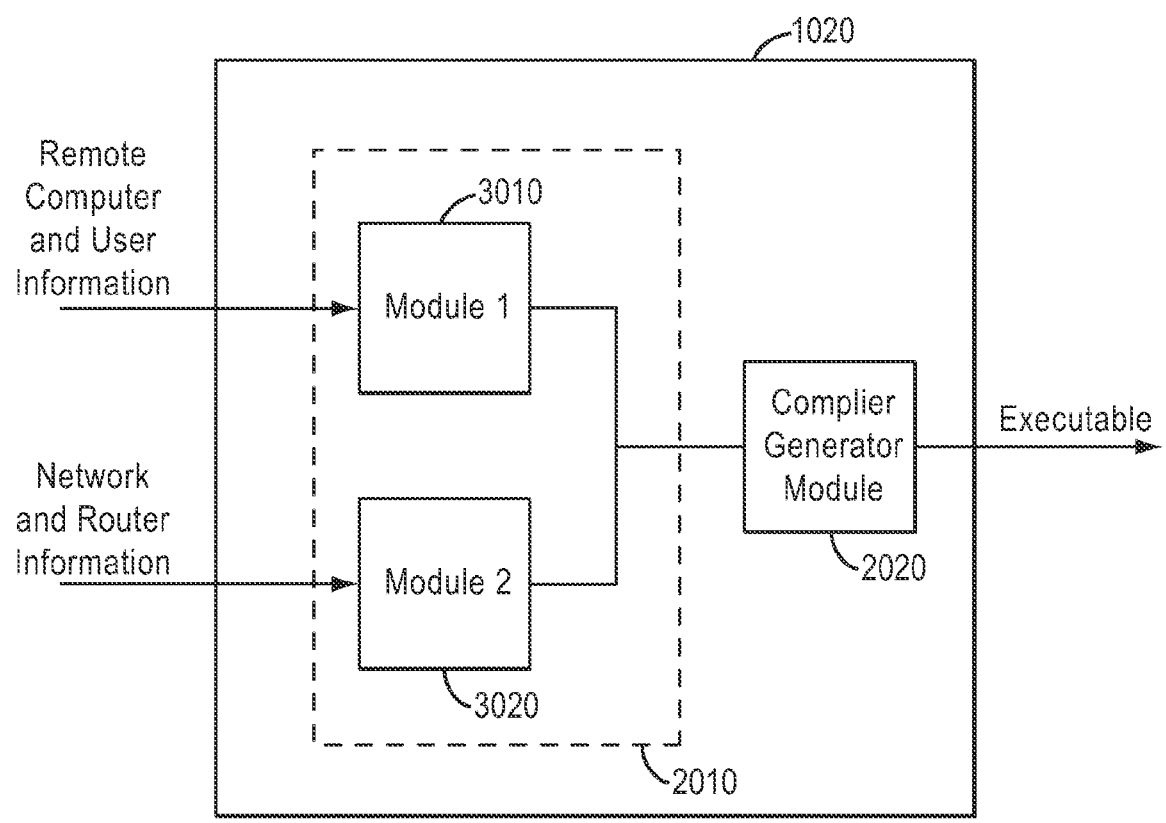
FIG. 4 illustrates the information collection module according to a first embodiment.

Referring to FIG. 4, additional detail of the information collection module 2010 according to the first embodiment is provided. As shown therein, the information collection module 2010 is preferably comprised of two sub-modules 3010, 3020. The first sub-module is a remote user information collection module 3010. The second sub-module is a network information collection module 3020. A network administrator would preferably manually enter information into each of these modules, according to one embodiment of the invention.

Each module of the information collection module 2010 is preferably displayed on a user interface screen (for example, a computer monitor) as a dialog box having prompts for the required information. The network administrator would preferably enter the required information into the associated text box, or select the appropriate radio buttons, and then apply the settings. Upon applying the settings, the information collection module 2010 would format the selected information so as to be usable by the compiler module 2020. It should be understood that the dialog box could be formatted in any manner, and could be partitioned into any number of sections and/or sub-screens. Each section would preferably be identified by an associated tab, which could be selected by the network administrator to access that section of the dialog box.

The remote user information collection module 3010 preferably collects information about the remote user and the remote user's computer. Specifically, it can preferably collect information concerning what operating system the remote user is running on the remote computer, as well as password and logon information for the remote user. By way of example, the password/login information can be for either a dial-up adapter, the LAN to which the VPN will connect, or both.

The network information collection module 3020 preferably collects information about the local area network (LAN) to which the VPN connection will be established. This information is necessary for the remote user to negotiate to the router that is coupled to the LAN, as well as negotiate through the router and/or gateway to access the LAN. Additionally, further information regarding the names of the computers on the LAN should be provided, as well as the location of the domain name service (DNS).

In a second embodiment, the information collection module 2010 would extract data directly from a database. Consequently, a dialog box would not be necessary. However, it would be possible to provide some user interface to direct the network administrator as to how to extract the relevant information. Moreover, there could be informational screens allowing the network administrator to verify incorrect information prior to generating the executable file. Preferably, information collection module 2010 would identify particular fields of the database that are needed by the compiler module 2020 and extract only that information. Additionally, once the information is extracted, the information collection module 2010 would preferably display the information for the network administrator to verify. Upon his verification, the network administrator would preferably cause the information to be transferred to the compiler module 2020.

According to the second embodiment of the information collection module 2010, any database design can be used. Preferably, the database would include at least the same information described above with respect to the first embodiment. Specifically, the database would include the information necessary for the remote user to negotiate to the router/gateway and then onto the LAN. Additional detail concerning this information will be provided below.

In both the first and second embodiments of the information collection module 2010, information regarding the remote user's e-mail address and security code can also be provided. In this way, the compiler module, upon generating the executable file, could automatically transmit all generator programs (including the configuration program and a dialog program) to the remote user. Moreover, the executable file could be encrypted, using the security code as the decryption key. Alternatively, if the program will be provided to the remote user by a method other than e-mail, a storage address could be provided to the information collection module 2010, identifying where the executable files should be stored. For example, it could be stored in a directory on a computer or to a removable storage unit, such as a floppy disk or a compact disc.

Referring again to FIG. 3, the compiler module 2020 is preferably software configured to generate an executable program using the data collected from the information collection module 2010. The executable program, when run on the remote computer, preferably configures the remote computer to be able to establish the VPN connection with the local network. In essence, the executable file is configured to install the VPN configuration onto the remote user's computer. It should be understood that the executable file could be used to configure their remote computer in any fashion so as to customize it to a user's needs. For example, an executable program could be generated to allow a remote user to configure a program on the remote computer, such as Microsoft Outlook, to be set up in a certain way. Thus, if a user wanted both their work computer and their home computer to have identical settings for a particular program, a network administrator could generate an executable file to configure the home computer to have the same settings as the were computer. The executable file would then be run on the home computer to change the configuration settings.

In the example of setting up the VPN connection, the compiler module 2020 preferably uses the information collected through the information collection module 2010 to generate an executable file that can be used by the remote user to configure the remote computer for the VPN connection. In the preferred embodiment, the executable file is configured to edit the Remote Access Service (RAS) files of the remote computer's operating system. Specifically, the RAS phonebook is preferably manipulated. It should be understood that any method of modifying the registry entries of the remote computer's operating system could be used. This could include directly modifying .INI files and .INF files, or any other configuration files for the remote computer.

In the preferred embodiment, the data that is received from the information collection module 2010 is either embedded or attached to the executable file, such that upon execution of the executable file on the remote computer, the data is used to configure the remote computer. In the preferred embodiment, the Microsoft installer program is used as the executable file. Microsoft installer is a binary resource out of the OCX program module. Thus, the installer is the first program built. The binary resource includes the configuration data, and because it is the first program to be built, the configuration data is initially empty. That is, the installer program is built with blank data.

When the information collection module 2010 generates the configuration data file, the blank data on the installer is replaced with the configuration data file. The installer program is preferably configured to call the RAS API, and use the data configuration file to modify the RAS entries. It should be understood that the executable file to use any method to modify particular registry entries. Accordingly, the RAS entries for VPN that have been built are attached to the installer program, and the executable file for configuring the remote computer is created.

Additionally, the compiler module 2020 could be configured to automatically e-mail the executable file to an intended recipient. Thus, part of the information collected by the information collection module 2010 would include the e-mail address of the intended user. Once the code is written by the compiler module 2020, it would automatically be inserted into an e-mail addressed to the intended recipient. This e-mail could either automatically be transmitted when the executable file is generated, or could await a user command prior to sending the e-mail. Thus, for example, the configuration program generator could be integrated with any type of e-mail program, such as Microsoft Outlook or Microsoft Outlook Express.

When integrated with an e-mail program, the executable file is preferably written to an e-mail manager, such as an outbox or a draft box of the e-mail program. That is, it is written to a path on the computer that corresponds to the outbox. Moreover, an outlook plug-in will interpret specific data within the database as an e-mail address. Accordingly, the e-mail is automatically generated with the executable file or files as an attachment. Additionally, the body of the e-mail can be configured to include instructions for running the executable file. These instructions can be either tailored to a particular operating system of the user, or all instructions can be included, allowing the user to pick the appropriate set of instructions.

It should be understood that information collection module 2010 and the compiler module 2020 could be formatted as a single dialog box, so that once the information is entered into the dialog box, a single click to accept the data would generate the executable file. Additionally, that single click could also be configured to automatically send the e-mail to the intended user. Moreover, it should be understood that the whole process could be transparent to the network administrator, and thus selecting a remote user from the database would automatically generate the executable file, and could also automatically e-mail the executable file to the remote user. Alternatively, the process could be partially transparent. That is, the network administrator would have an opportunity to review dated extracted from the database prior to generating the executable file. Moreover, the network administrator may be required to manually e-mail the program to the recipient.

It should be understood that the information collection module 2010 could be a stand-alone program, or could be a module within another application program. For example, information collection module could be an OCX module and part of a Microsoft Access database. Alternatively, the program could be written and compiled in any programming language, and configured to perform the same tasks. In the preferred embodiment, the information collection module is an OCX module.

Figure 5:
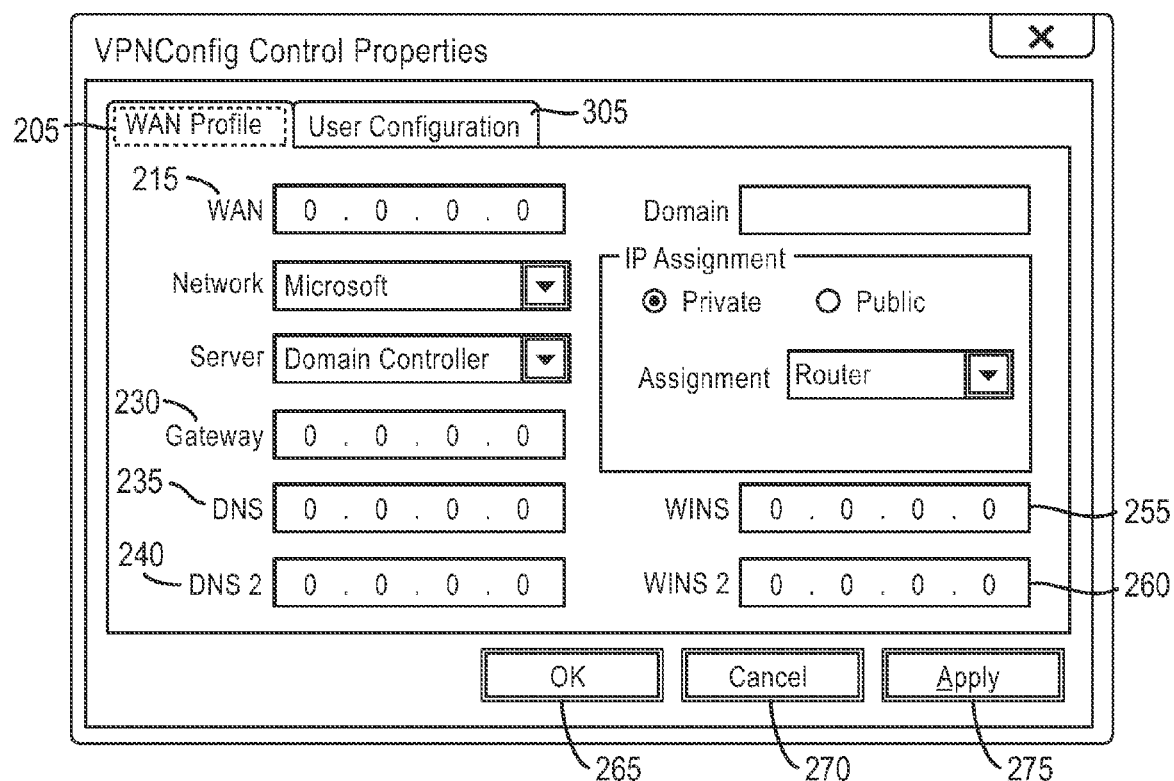
FIG. 5 illustrates additional details of the information collection module according to the first embodiment.

Referring to FIG. 5, additional details of the first embodiment (manual data entry) of the information collection module 2010 of FIG. 3 are provided. As shown in FIG. 5, a dialog box 200 of the configuration program generator according to a preferred embodiment is shown. The dialog box preferably includes a plurality of tabs to distinguish between information screens. In the preferred embodiment, a WAN profile tab 205 and a user configuration tab 305 are provided. The WAN profile tab 205 corresponds to the network information collection module 3020 of FIG. 4, and the user configuration tab 305 corresponds to the remote user information collection module 3010 of FIG. 4. FIG. 5 shows details of the dialog box with the WAN profile tab selected. Details of the user configuration tab 305 will be described blow with reference to FIG. 6.

The WAN profile tab 205 provides a user interface for the system administrator to enter information relating to the network to which the remote user will connect. First, a WAN text box 215 is provided. It is preferably configured in a format to accept a WAN number. The WAN number describes the IP address for the router/gateway. This information is used by the remote computer to identify the router/gateway to which it will connect to establish the VPN connection. This number is preferably a static IP address that uniquely identifies the WAN to the outside world. Additionally, a gateway text box 230 is also provided. Within this text box, the administrator preferably enters the private gateway information. This address, also formatted as an IP address, cannot be seen by the outside world when they look at the router/gateway on the Internet. Again, this text box is preferably formatted as a standard IP address. Thus, the default dialog box is preset with all zeros, such as "0.0.0.0" In the preferred embodiment, when a prescribed number of digits is entered prior to any one of the dots, the cursor automatically moves to the next digit in the address.

Next, a text entry box is provided for the primary and secondary DNS addresses 235, 240. The DNS (domain name system) is the way that Internet domain names are located and translated into IP addresses. Various lists of domain names and IP addresses are distributed throughout the Internet in an hierarchical structure, rather than maintaining a central list of domain name-to-IP address translations.

Next, a text entry box is provided for the primary and secondary WINS addresses 255, 260. The WINS address points to location on the network where the Windows Internet Naming Service (WINS) resides. WINS is an operating system based service that manages the association of workstation names and locations with IP addresses. This is done without a user's or an administrator's input. WINS thus automatically creates a mapping entry in a table to map a computer name to an associated IP address. Each computer name is unique. If a computer is moved to another geographic location, the subnet part of the IP address will most likely change. WINS ensures that the new subnet information will be updated automatically in the WINS table. WINS works in conjunction with the Dynamic Host Configuration Protocol (DHCP), which negotiates an IP address for any computer when it is first defined to the network.

Figure 6:
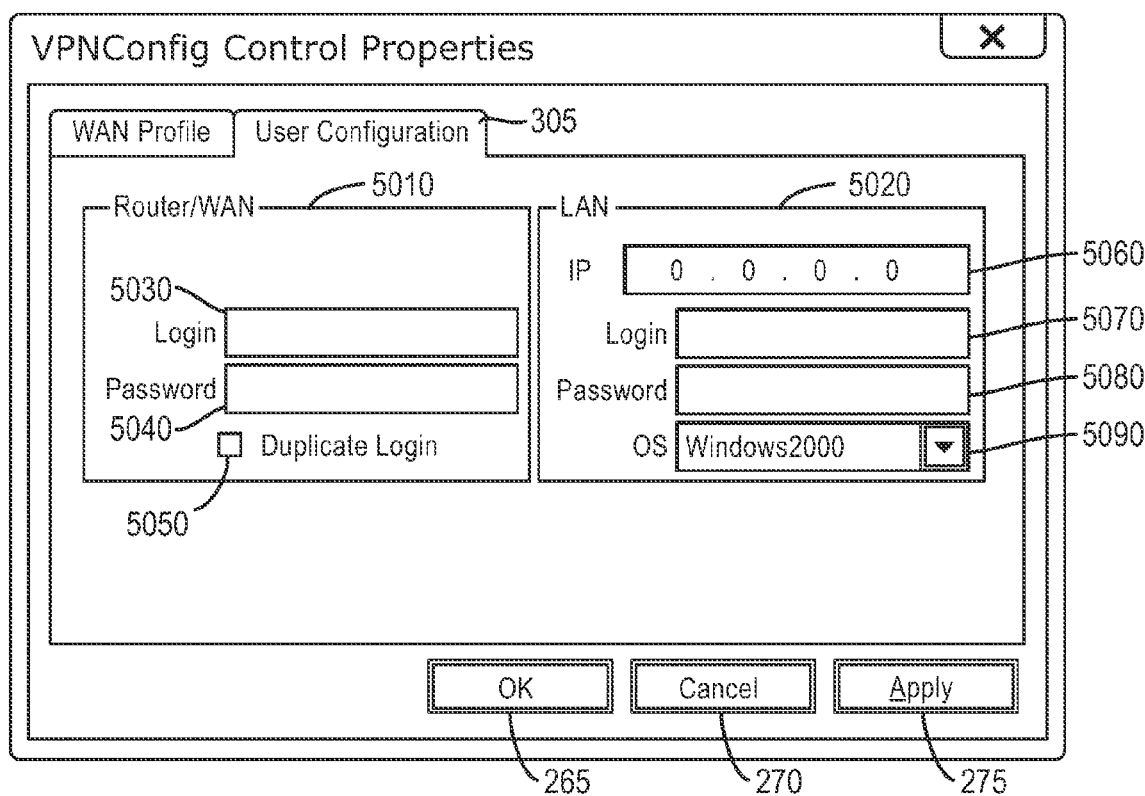
FIG. 6 illustrates the user configuration tab of the information collection module according to the first embodiment.

FIG. 6 illustrates additional details of the first embodiment of the information collection module 2010 with the user configuration tab 305 selected. The user profile configuration box is preferably divided into two sections. The first section is the router/WAN section 5010, and the second section is the LAN section 5020. Within the LAN section 5020, there is a free formatted text box for the LAN IP address 5060. This text box is preferably presented with all "0" entered in each segment of the IP address. Additionally, the text box is preferably preformatted with dots between the initial zeros, for example having "0.0.0.0" as the initial address. Next, text boxes for login 5070 and password 5080 are presented. These are the login and password necessary for the user to access LAN. Finally, a drop-down box 5090 is provided to select the operating system of the remote computer. Any operating system could be selected from this drop-down box. Based on the selection of operating system, the executable file will be generated to configure particular aspects of the corresponding operating system. In the preferred embodiment, the LAN password is not needed. The LAN login is used to change the name of the computer. Thus the user will be prompted to give the password. Also the system can be configured to prompt for both the user name and password.

On the router/WAN side 5010, a text box is provided for each of login 5030 and password 5040. These represent the login/password combination necessary for the remote user to access the router. Additionally, there is a duplicate login check box 5050 provided to indicate whether the login/password combination for the router/WAN is the same as the login/password combination for the LAN. By checking this box 5050, the login/password combination entered on the router/WAN side 5010 is automatically entered on the LAN side 5020.

As with the WAN profile configuration dialog box, control buttons are provided for accepting or rejecting the information provided. These control buttons include an "OK" button 265, a "cancel" button 270, and an "apply" button 275.

According to the second embodiment, where a database is used to directly provide the information to the compiler module, the database would preferably have all the information described above with respect to FIGS. 40 and 50. Specifically, for each record of the database, fields for WAN information, WINS information, and DNS information would preferably be provided. Additionally, a user's login/password information would also be provided.

Figure 7:
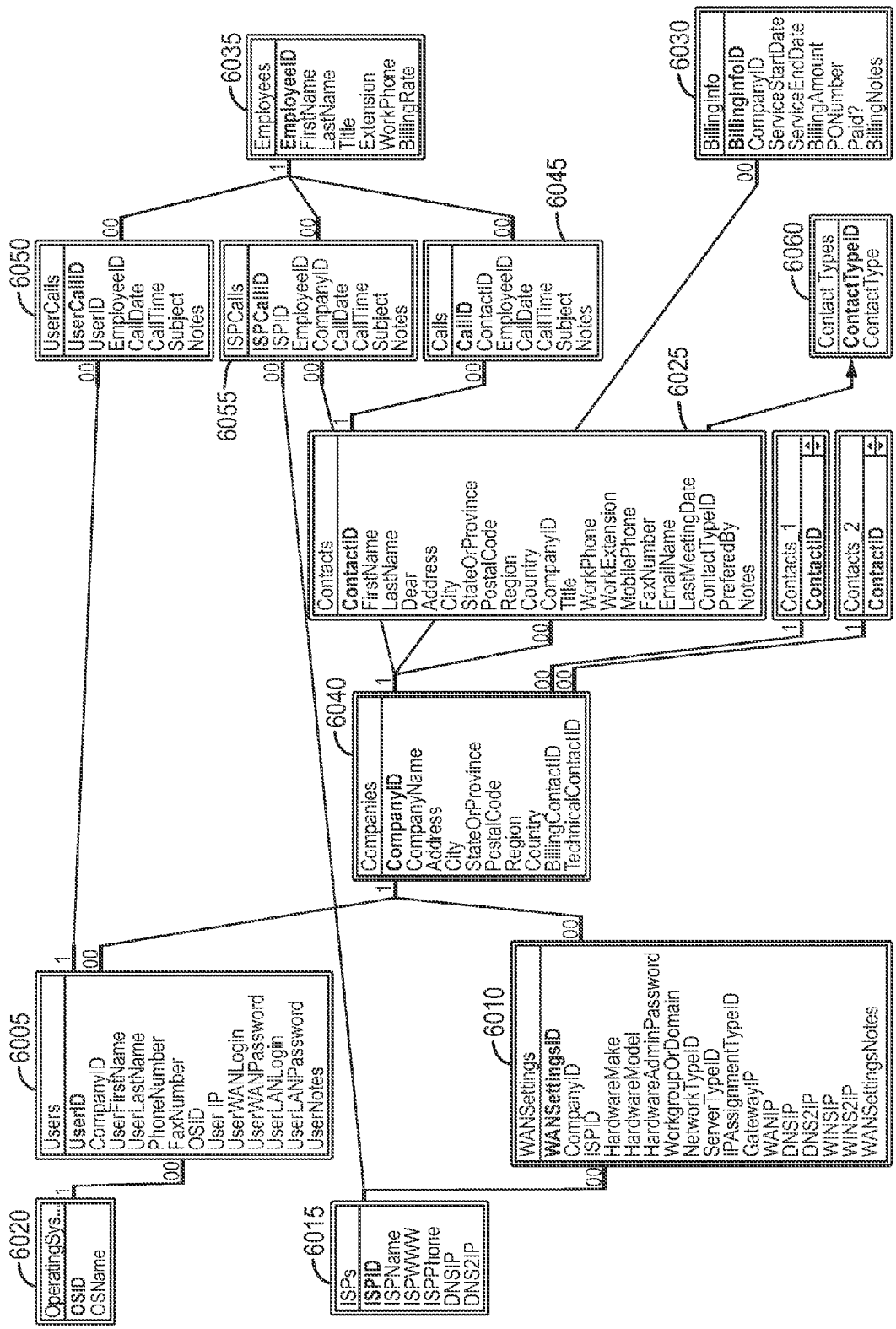
FIG. 7 illustrates a construction of the database that is preferably used with the second embodiment of the information collection module.

Referring to FIG. 7, a construction of the database that is preferably used with the second embodiment is shown. It should be understood, however, that any method of storing and collecting data can be used, such as a spreadsheet, a text table, or comma separated values. Additionally, any layout of the database could be used. Preferably, the database will include modules for collecting and storing information needed to generate the executable program by the configuration program generator. For example, there may be a users module 6005, WAN settings 6010 module, ISP module 6015, and an operating system module 6020. The users module 6005 may require, for example, user identification information, user first name information, user last name information, user phone number information. Additionally, it may require user IP address information, user WAN login information, user WAN password information, user LAN login information, and user LAN password information. Additional user information that is not relevant to generating the executable file may also be stored in the database.

The WAN setting module 6010 is preferably configured to store information such as WAN settings identification information, company identification information, ISP identification information, hardware make information, hardware model information, hardware administrative password information, workgroup or domain, network type identification information, server type identification information, IP assignment type identification information, Gateway IP information, WAN IP information and, primary DNS information, secondary DNS information, primary WINS information, secondary WINS information, and WAN setting notes. At a minimum, however, the WAN setting module 6010 should include the information required by the configuration program generator to generate the executable file.

Next, the operating systems module 6020 is preferably configured to store information such as operating system identification information and operating system name. The ISP module 6015 is preferably configured to store information such as ISP identification information, ISP name information, ISP address information, ISP phone information, primary DNS IP information, and secondary DNS IP information.

Other information that may also be provided based on the particular need of the user may include information such as contact information 6025, billing information 6030, employee information 6035, company information 6040, calls information 6045, user calls information 6050, ISP calls information 6055, contact types 6060, and any other pertinent information.

Additionally, the database is preferably a Customer Management Program (CMP). As such, it preferably includes full support and fields for troubleshooting the database. Additionally, the database could include personal information regarding each user to validate the users. Such information could be mother's maiden name, place of birth, Social Security number, or any information that could authenticate a particular user.

Additionally, the database could be configured so that information common to all users would not have to be entered into the database each time a new users added. For example, if all users in the database will be establishing a VPN connection to the same network, information such as the DNS numbers and the WAN/Gateway address could automatically be inserted into the appropriate fields of the new record. Alternatively, if the database is used to manage a plurality of networks having different configuration settings, all users associated with any given network could be identified (for example by using a company name) as belonging to the same group. When that group identification is provided to the database for a new user, the proper information for that user could automatically be populated into the fields of the database.

Moreover, other information to be automatically inserted into other fields for each record. For example, if it is determined that the client is Microsoft, when the Microsoft client is selected for a new record in the database, the database will automatically insert all associated Microsoft features.

It should be understood that any database configuration or structure can be used, and the particular modules described above need not be present. Moreover, the database can be any type the database, such as SQL or Microsoft Access. Any method of storing some or all of the data necessary to generate the executable files by the configuration program generator of would be suitable. Moreover, in the preferred embodiment, the information from the database is provided directly to the configuration program generator to generate the executable file for any given remote user. This eliminates the need for the network administrator to manually enter the information.

Additionally, when the database is used to generate the e-mail, string tables for the mailer modules are provided. This information is interpreted as an e-mail address.

Next, a description of how a network administrator would manually use the above described system according to the first embodiment is provided. It should be understood that this process could be circumvented by associating the database with the configuration program generator, allowing the network administrator to simply select a user from the database and automatically generate the executable file according to the data in the database, in accordance with the second embodiment.

Figure 8:
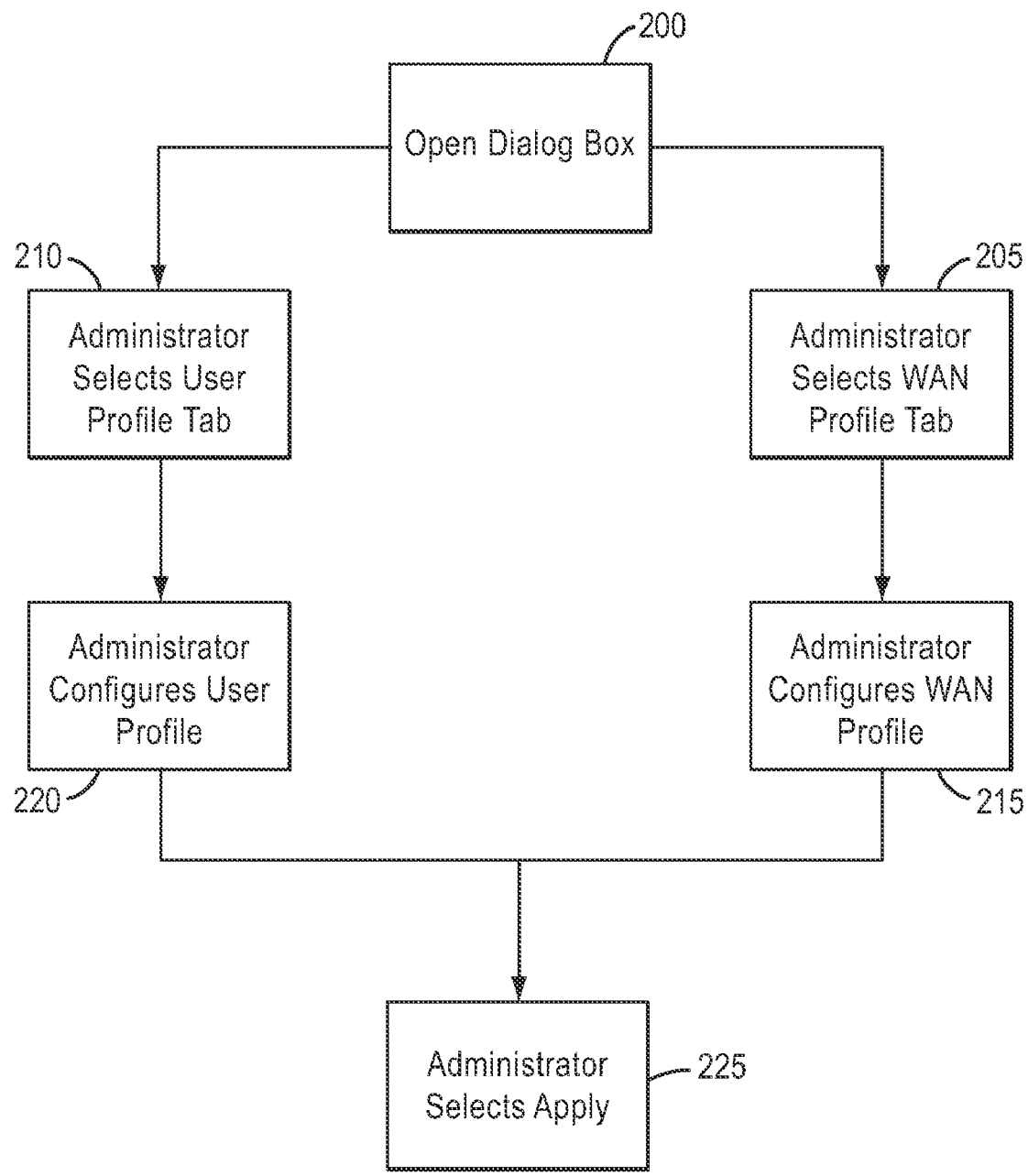
FIG. 8 illustrates a method of providing information to the information collection module according to the first embodiment.

Referring to FIG. 8, using the manual procedure of the first embodiment, a network administrator would first preferably open a dialog box of the configuration program generator, as shown in step 200. This dialog box represents the information collection module. The dialog box preferably includes a plurality of tabs to distinguish between various information screens. The network administrator would then select one of the tabs to determine which information screen would be displayed. Thus, the administrator could choose the WAN profile tab, as shown in step 205, or choose the user profile tab, as shown in step 210.

Depending upon the selected tab, the network administrator would then enter the appropriate information for the information screen that is displayed. Thus, if the administrator had chosen the WAN profile tab in step 205, the administrator would then proceed to enter WAN profile information, as shown in step 215. Alternatively, if the administrator had chosen the user profile tab in step 210, then the administrator would proceed to enter user profile information, as shown in step 220.

In the preferred embodiment, both WAN profile information and user profile information need to be entered. Thus, upon entering information corresponding to one of the information screens, the administrator would next show the other information screen. When information for both information screens have been entered, the administrator would apply the settings to generate the binary data file, as shown in step 225. The binary data file is then used to generate the executable file to be deployed to the remote user.

Figure 9:
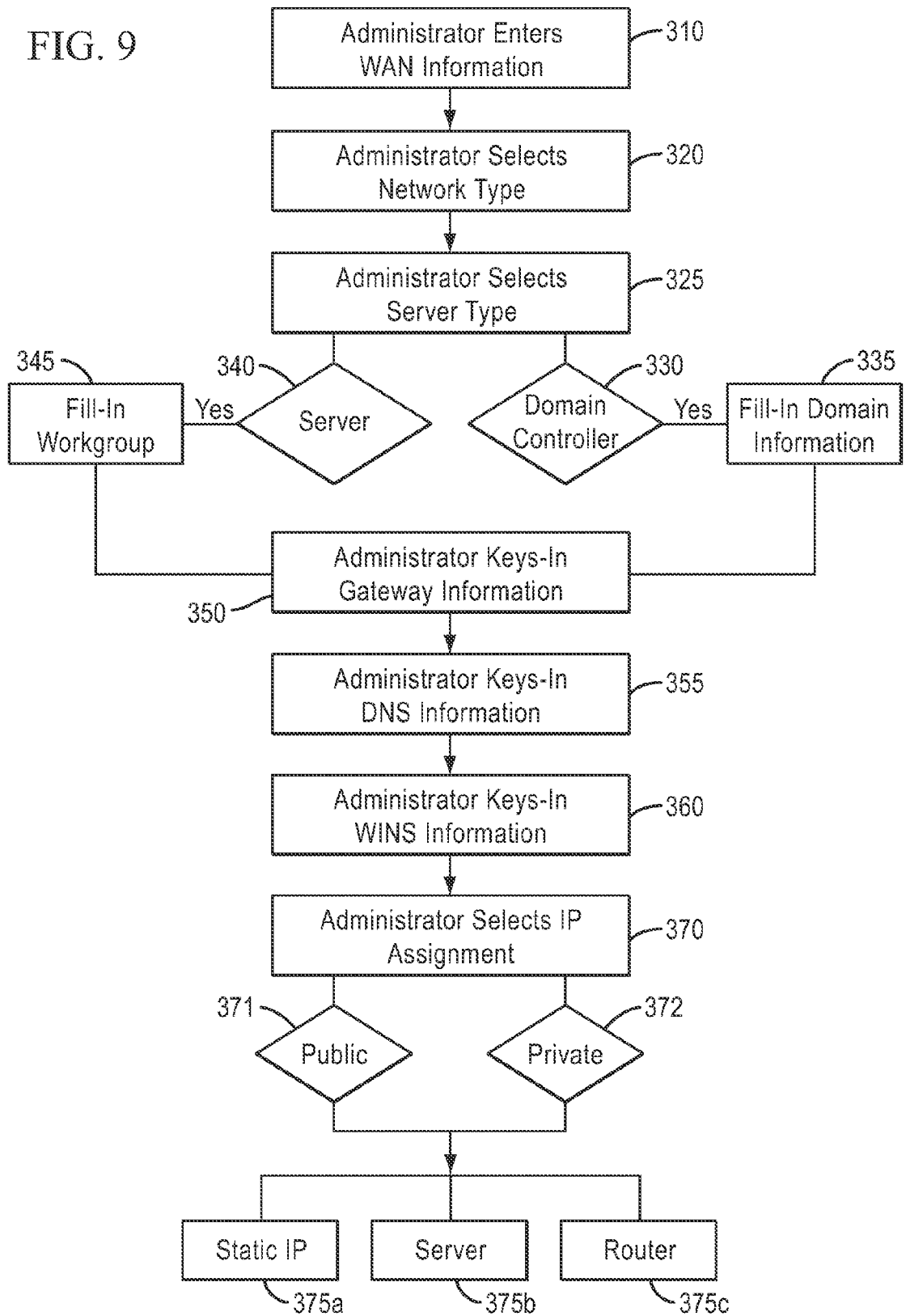
FIG. 9 illustrates a method of providing WAN profile information to the information collection module according to the first embodiment.
Figure 10:
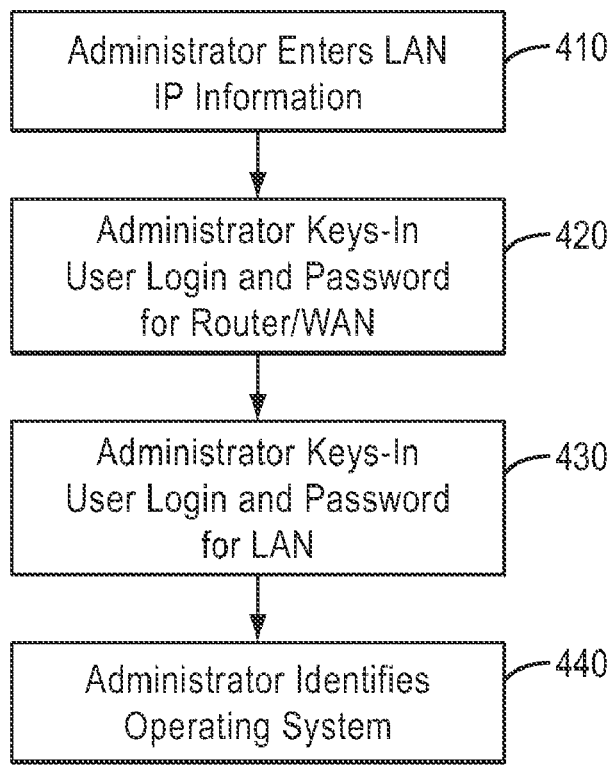
FIG. 10 illustrates a method of providing remote user information to the information collection module according to the first embodiment.

Additional details for each of the selectable dialog box tabs will be provided next. FIG. 9 illustrates the steps to be followed by the network administrator if the network administrator selects the WAN profile tab in step 205 of FIG. 8, and FIG. 10 illustrates the steps to be followed by the network administrator if the network administrator selects the user profile tab in step 210 of FIG. 8. It should be understood that the steps need not necessarily be performed in the sequence shown. For instance, the network administrator can enter the information in any sequence, so long as all necessary information is provided. However, for sake of explanation, a particular sequence is outlined below.

Referring to FIG. 9, the network administrator selects the WAN profile tab in the information collection module dialog box. In the preferred embodiment, the dialog box is displayed on a computer monitor, and includes text boxes in which to input various information. The text boxes are labeled with a description of the information to be provided in the associated text box. Additionally, for text boxes that require network addresses, the text boxes are preformatted as blank IP addresses, and with a field size limit for each number to be entered. Thus, it would be impossible to enter and incorrect number format for any given network address.

Next, as shown in step 310, the network administrator first enters a WAN profile number corresponding to the LAN/gateway/router. The WAN number preferably describes the IP address for the router/gateway. This information is used by the remote computer to identify the router/gateway to which it will connect to establish the VPN connection. This number is preferably a static IP address that uniquely identifies the WAN to the outside world.

Next, as shown in step 320, the administrator would identify the type of network configuration of the LAN. For example, the network type could be Novell, NetWare, or Microsoft. It should be understood that any kind of network environment could be used. For the purposes of example, it will be assumed that Microsoft is selected. By selecting the type, both the client and file/printer sharing our determined.

Next, the administrator would preferably enter the type of the LAN, as shown in step 325. For example, the LAN could be configured as a Server or as a Domain Controller. It should be understood that any LAN configuration can be implemented at this point. If the server type is selected as "Server," as shown in step 340, then the administrator next identifies the workgroup, as shown in step 345. The Workgroup information determines what group of users exchange access to resources on the network. The workgroup information is preferably maintained on the server. Alternatively, if the administrator selects "Domain Controller" as a server type, as shown in step 330, and administrator would be prompted to fill in the domain information, as shown in step 335. In this scenario, the administrator would enter the Domain Controller group name needed to access the network. The domain information is used to uniquely identify a particular user.

The network administrator would next provide the gateway address information for the router/gateway, as shown in step 350. The gateway address is the IP address of the LAN. It may be public, and on the outside world, but may also be private and not known to the outside world. This IP address is for the network to see out from the LAN. Thus, when a user logs on to the network using the VPN connection, that user will access the Internet through the network, as opposed to through his own Internet connection.

Next, as shown in step 355, the administrator would provide the primary and secondary DNS addresses. The DNS (domain name system) is the way that Internet domain names are located and translated into IP addresses. Various lists of domain names and IP addresses are distributed throughout the Internet in an hierarchical structure, rather than maintaining a central list of domain name-to-IP address translations. In the preferred embodiment the administrator would determine the DNS number by querying the ISP. However, an administrator may receive DNS information from any other source. The administrator would also preferably enter a second DNS number as received for the ISP. However, only one DNS number is necessary for the operation.

Next, as shown in step 360 the administrator preferably enters at least one WINS number, and optionally enters a second WINS number as well. The WINS address points to a network location where the Windows Internet Naming Service (WINS) resides. This is typically located on the server, although it could be located on any machine on the network. Additionally, the WINS information is preferably known by the administrator based on the network configuration, although this information can be obtained by the administrator from any other source.

WINS is an operating system based service that manages the association of workstation names and locations with IP addresses. This is done without a user's or an administrator's input. WINS thus automatically creates a mapping entry in a table to map a computer name to an associated IP address. Each computer name on the network is unique. If a computer on the network is moved to another geographic location, the subnet part of the IP address will most likely change. WINS ensures that the new subnet information will be updated automatically in the WINS table. WINS typically works in conjunction with the Dynamic Host Configuration Protocol (DHCP), which negotiates an IP address for any computer when it is first defined to the network.

The administrator next optionally selects an IP assignment from a plurality of IP assignments, as shown in Step 370. The IP assignment to be one of public and private, as shown in steps 371 and 372. Moreover, as shown in steps 375a–375c, the administrator may select a router option, a server option, and a static IP option.

The IP addresses the remote computer's IP address on the network. The assignment of the IP address can be set by the DHCP router or the DHCP server, or a static IP address can be given by the system administrator. If all zeros are initially used, this typically signals that the DHCP should be prompted to assign an address.

It should be understood that the WAN profile dialog box could prompt the network administrator for additional information. However, in the preferred embodiment, the above information is sufficient. Thus, if the user information has already been provided (under the "user" tab of this configuration dialog box), the network administrator would proceed to generate the user data binary file. However, if the user data information has not yet been provided, the network administrator would select the user information tab to display the user information portion of the information collection module dialog box.

FIG. 10 illustrates a method of providing remote user information to the information collection module according to the first embodiment. Thus, referring to FIG. 10, the network administrator selects the user profile tab in a dialog box. Once that is selected, a user interface module dialog box appears, which prompts the network administrator to enter user specific information. This information is used to enable the remote user to login to the router/WAN, as well as to login to the LAN. In the preferred embodiment, the information gathered from this dialog box is used to generate the automatic login portion of the executable file. It should be understood that, except for the remote computer's operating system, this information is not necessary to establish the VPN connection; rather, it is used to provide a method of automating the login process to make it easier for the remote user. Thus, if this information is provided, after the remote computer has been configured by running the configuration executable file, a "Dialer" program appears as an executable file on the remote computer. The remote user can then simply select the dialer program to be automatically connected to the LAN.

In the absence of this information, after the computer is configured for the VPN connection, the user would be faced with several login/password dialog boxes before gaining access to the LAN. For some users, this becomes cumbersome. Consequently, in the preferred embodiment, the network administrator provides the login/password information for the user to the configuration program generator prior to generating the executable file. This information could be provided manually or could be extracted from the database. By providing the login/password information, the configuration program generator is adapted to generate a Dialer program that could be deployed on the remote computer. When the remote user executes the Dialer program on the remote computer, and if the remote computer has been properly configured for the VPN connection, a VPN connection between the remote computer and the local network is automatically established.

It should be understood that the Dialer program could be generated and deployed to the remote computer separately from the network settings executable file. For example, the dialer program could be sent to the remote computer by a separate e-mail, or any other file delivery method. Consequently, should the login/password combinations for the remote user change at any time, the network administrator could provide a new dialer program having the revised login/password information. Additional information regarding the Dialer is provided hereinbelow.

Referring again to FIG. 10, the network administrator first enters the LAN IP address, as shown in step 410. This information preferably corresponds to the LAN that the remote user will access. Next, as shown in step 420, the administrator enters the remote user's login name and password for the router/WAN. Additionally, the network administrator enters the remote user's login name and password for the LAN, as shown in step 430. It should be understood that if this login/password combination is identical to the router/WAN login/password, the administrator can simply select a check box indicating "duplicate login." By doing this, the login/password information for the LAN is automatically copied from the router/WAN information.

Finally, in step 440, the administrator identifies the operating system that the remote computer is using. This is necessary for the executable configuration program to properly modify the operating system parameters to establish the VPN connection. In the preferred embodiment, Windows XP, Windows 2000, Windows ME, or Windows 98 appear in a drop-down menu box. However, it should be understood that any operating system could be selected, including UNIX or LINUX, or any successor to the Windows family of operating systems. Moreover, and the preferred embodiment, a single executable files will work with all supported offering systems.

If the network information has already been provided (under the "WAN profile" tab of this configuration dialog box), the network administrator would proceed to generate the user data binary file. However, if the network information has not yet been provided, the network administrator would select the "WAN profile" tab to display the network information portion of the information collection module dialog box.

The user data binary file is then used when generating the executable file. This information is interpreted by the remote computer so as to configure the remote computer for establishing a secure Internet connection to the LAN. The secure Internet connection between the remote computer and the LAN is the Virtual Private Network (VPN). In a preferred embodiment, Point-to-Point Tunneling Protocol (PPTP) is used for establishing the VPN connection. PPTP is a Layer 2 tunneling protocol which allows the remote computer to use a public IP network to communicate securely with the local computer (for example, the LAN server). PPTP thus essentially tunnels the IP. A VPN "tunnel" between the LAN and the remote computer allows traffic to flow securely across the Internet. The PPTP tunnel is preferably established using the Dial-Up Networking functions of the Windows operating system. Remote users are preferably authenticated using MS-CHAP against a user/password list maintained. Other authentication schemes, however, could be used. PPTP is described in RFC 2637, "Point-to-Point Tunneling Protocol (PPTP)," which is incorporated herein by reference. Consequently, in the preferred embodiment, the Dial-Up Networking aspects of Windows are manipulated by the executable file. For example, the RAS phonebook entries could be modified or registry entries pertaining to Dial-Up Networking could be modified.

Alternatively, IPSec could be used instead of PPTP. IPSec includes a series of protocols to handle data integrity and confidentiality when transmitting secure data across the Internet. A first protocol, the Authentication Header (AH) protocol handles data integrity, and a second protocol, the Encapsulated Security Payload (ESP) protocol, resolves both data integrity and confidentiality issues.

Each VPN tunnel created with IPSec is preferably assigned a specific Security Parameter Index (SPI) to differentiate it from other VPN tunnels configured on router/gateway. An SPI is an arbitrary, 32-bit number that tells the receiving device which group of security protocols (such as algorithms, keys and their longevity) the remote user is using for communication.

IPSec is described in RFC 2401, "Security Architecture for the Internet Protocol," and RFC 2709, "Security Model with Tunnel-mode IPsec for NAT Domains," which are incorporated herein by reference. The same general theory would apply to IPsec as applies to PPTP with respect to configuring the remote computer to establish the VPN connection.

Additionally, it should be understood that the configuration method described herein can be applied to any communication protocol. For example, in addition to PPTP and IPsec, L2TP could also be used, or any other protocol, especially any other tunneling protocol.

Additional information concerning the Dialer program is next provided.

The Dialer program is a application that functionally performs dialing functions using any operating system. According to the preferred embodiment, its calls dialing functions contained with Microsoft "Dial-up Networking" contained within Microsoft Windows versions 95/98/ME and "Network and Dial-up Connections" within Microsoft Windows versions 2000/XP. The Dialer preferably assist in the operation of the connection method described herein by providing navigation for the user, and it binds user announcements when activating a connection. For example, it provides a user with the ability to activate a VPN connection using a single "click" of a mouse.

Additionally, the dialer can assist in providing various be security parameters within a remote access solution. For example, when making a connection "active" a user must provide information that validates that user for security features. This provides protection of both the "Caller" (the remote user making a secure connection) and the "Callee" (the network topology with this remote access feature). Every secure VPN or network connection requires some form of verification. The Dialer provides a module for both user verification, as well as connection activation.

The Dialer preferably makes user navigation easier. When the user initiates and starts a connection to get to a destination network, at least one, and typically several connections need to occur to access the network.

For example, a user may first need to access the Internet. After the Internet connection is established, the user or the VPN might possibly need to initiate a connection "directly" to the device that holds the parameters of how that user is going to "talk" (i.e. communicate) to the network topology. This includes encapsulation and authentication, i.e. the WAN Profile of the Callee. The third connection is necessary to access the network structure, for example to join the "Network Neighborhood," from the remote location. This is performed by the internal validation (user accounts and privileges) within the network topology, and preferably occurs within a network server or appliance when a new connection is established or sensed by the network server or appliance.

Pending on the number of network servers or appliances and security parameters within a network topology, each server can require a different validation of the same server. The Dialer eliminates the second of the stated connections because when the user has some or any connection to the Internet, the Dialer brings the "Caller" through the Internet to the "Callee" using a single "click."

To perform these functions, the Dialer preferably contains all the required announcements and authentications the user needs to both start and complete a secure connection to the network. Thus, the dialer contains programming code configured to select and initiate a specific dialing function. For example, the dialer can be configured to select and initiate a specific "RAS phonebook entry" that has been created using the above described configuration process.

Additionally, the Dialer replaces the "default" announcement program that is bound to any connection profile built in the operating system's dialing functions. For example the dialer would replace the connection profile contained in the "Dial-up Networking" contained within Microsoft Windows versions 95/98/ME, and would replace the "Network and Dial-up Connections" within Microsoft Windows versions 2000/XP.

By using the Dialer, user does not need to know the user's particular login and password combination to access the WAN of the network. Additionally, the Dialer will not work on any RAS phonebook entry that is not a match to the corresponding label. In doing this the dialer can direct both security and how the user connects because without the Dialer no connection can or would be made.

In the preferred embodiment, the Dialer is built from the user settings index within the database. Additionally, it is specific to the WAN Login and WAN password for a particular user. At both input fields the remote access engineer can configure and design a custom Dialer that is very complex containing a series of numbers, letters and characters, completely random" and unknown to the user. However, because this information is known to the dialer, access will be granted to the network.

Thus, when the remote computer executable configuration file is generated to establish the VPN connection, the network administrator preferably deploys the executable file to the remote user. This can be done by any method of transferring data, including attaching the program to an e-mail or providing on a computer readable medium. Additionally, if a Dialer executable program has been generated, it can be deployed simultaneously with the configuration executable file. It should be understood, however, that each of these executable files can be deployed separate and apart from the other executable file. For example, if a user is required to change a login/password combination according to a prescribed time schedule, the network administrator could deploy the dialer executable program to the remote user with the updated login/password combination at the appropriate time. When the remote user executes this updated program, the login/password settings on the remote computer are updated. Additionally, according to the preferred embodiment, the executable configuration file is self deleting. That is, upon execution on the remote computer, after the remote computer is fully configured the executable file is automatically deleted from the remote computer. Alternatively, the dialer program could be set up to search for the configuration program the first time the dialer program is executed. If the configuration program is found, than the dialer program could be configured to automatically delete the configuration program.

Figure 11:
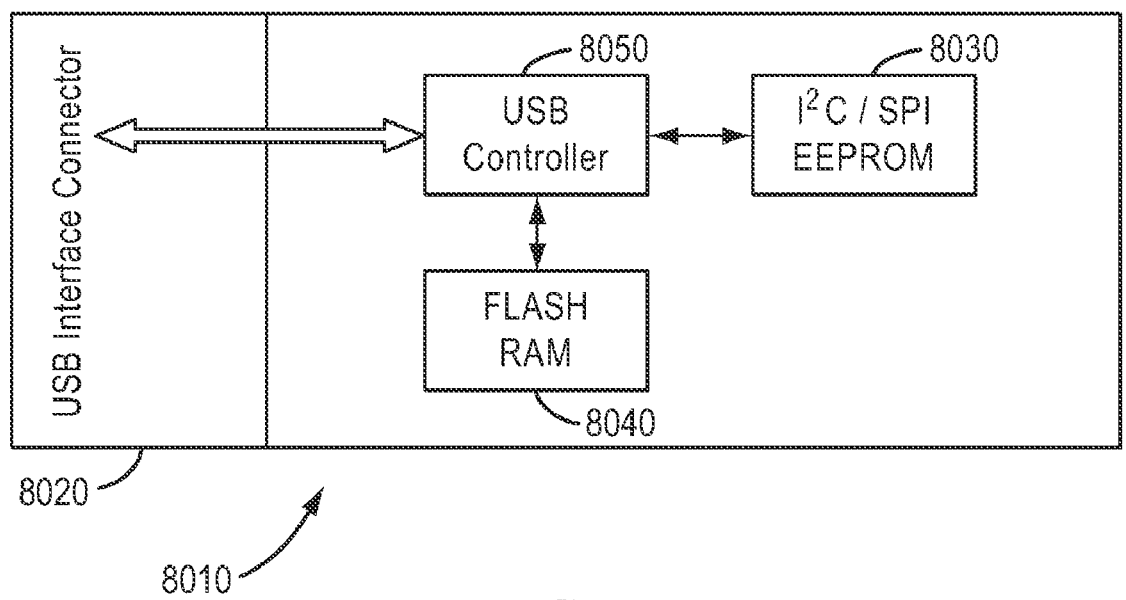
FIG. 11 illustrates a USB storage device including the executable remote configuration file according to the preferred embodiment.

Moreover, and order to enhance security, the configuration and dialer programs to be deployed to the user can stored within a removable USB key-type memory device that is provided to the user. Referring to FIG. 11, the USB key-type memory device 8010 is a small portable single piece device that plugs into a USB port of a computer using the USB interface connector 8020. The USB key-type memory device 8010 preferably includes an electronically erasable read-only memory (EEPROM) 8030. The USB key also preferably includes a flash RAM 8040. The EEPROM 8030 is preferably a locked EEPROM section, which prevents users from accessing information stored therein. The flash RAM 8040 is a general storage area, which emulates a disk/hard drive. The EEPROM 8030 can be write protected all the flash RAM 8040 is for storing general data. The USB key-type memory device 8010 further includes a USB controller 8050 to control the device.

Because the EEPROM 8030 is inaccessible to users, the can be used to store verification and/or encryption information. According to the preferred embodiment, before the configuration program or the dialer program can be run, whether from a hard drive, a remote disk, or the flash RAM 8040, the program would first query the EEPROM to authenticate the user. Thus, if the USB key-type memory device 8010 is not coupled to the USB port of the computer, neither the configuration program or the dialer program will work.

Thus, the dialer program and configuration program could initially be stored to the file structure section of the removable key. These programs could be run directly from the key, or could be copied to a hard drive and run from there. However, without the USB key being inserted into the USB drive, the programs would not operate.

Specifically, as part of the configuration program and the dialer program, a special code could be incorporated that requires the program to access the EEPROM 8030 of the USB key 8010. Within that EEPROM 8030, a password could be stored that would authenticate the dialer program and/or the configuration program.

To generate the USB key 8010, the administrator would first access the EEPROM 8030 of the USB key 8010 to program a password that would be used by another program. Accordingly, it would not be necessary for the remote user to even know the password; rather the programs to be executed in automatically query for the password. The executable program, in order to run, would need to verify the existence and authenticity of the password on the EEPROM 8030 of the USB key 8010.

The executable programs, for example the dialer program or the configuration program, can be stored in the flash RAM 8040 of the USB key 8010. When the dialer program is run, it would first query the EEPROM 8030 to determine if the password stored in the EEPROM 8030 is identical to that which is required by the dialer program. If the password matches, than the program will run. Otherwise, no connection can be made to the VPN. Even if the dialer program is copied to the hard drive, a would still require the authentications through the USB key. Thus, if the dialer program is copied to a hard drive other than the USB key 8010, it will not operate unless the USB key 8010 is installed on the system.

Moreover, and order to protect the key for being stolen, a further layer of security could be used that requires the user to enter a password to authenticate the user prior to authenticating the key. Moreover, the dialer program could be encrypted, when the decryption key being stored in the EEPROM 8030 of the USB key 8010. Thus, would be very difficult, if not impossible, for someone to modify the dialer program to run without use of the USB key 8010. It should be understood that the configuration generator program can also be so encrypted. Additionally, the information on the EEPROM 8030 could also be encrypted.

Additionally, because the installer program is intended to be run once while the dialer program is intended to be run every time a VPN connection is desired, each of the two programs could have a unique password stored on the EEPROM 8030. When the installer program is run, it would call for the associated password stored on the EEPROM 8030. After installation, it would preferably erase that password. Consequently any further attempt to run the installer program would fail for lack of authentication. Meanwhile, the dialer program would have a different password associated with it on the EEPROM 8030. Accordingly, when the dialer program is run it would first query the associated password on the EEPROM to determine the authenticity of the key. If the password were found, then the dialer program would proceed to establish a connection to the server.

The system and method for automatically configuring a remote computer according to the preferred embodiment has various advantages. For example, it allows a network administrator to easily configure remote computers by generating a single executable file that can be provided to the remote user for execution. By doing this, the network administrator can save much time and can more actively manage the network. Additionally, any portion of a remote user's computer can be remotely configured by using an application program designed to manipulate the registry of the remote computer. Consequently, anyone with the need to remotely modify the configuration settings of a computer can generate an executable file to be run on the remote computer to accomplish the configuration update. Additionally, by having a conduit from a database to the program modules, it becomes easy to generate a large number of such executable files in a short period of time. This allows for efficient management of remote users.

Moreover, according to the preferred embodiment, the remote user's computer is seen as a gateway in establishing the VPN connection to the host/local computer. Accordingly, because a VPN connection is typically established between gateways, it is possible to automatically establishing VPN connection between the local computer's gateway and the remote computer directly. Thus the remote computer essentially becomes a router.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of configuring a remote computer to access a network of computers, comprising:
initiating, at a network administrator computer of the network of computers, an installer program having an empty binary file, the installer program being configured to generate an executable file using the binary file when the empty binary file is populated;
accessing, at the network administrator computer, a network database using a user data application to extract configuration data that represents binary settings of a network topology and binary settings of the remote computer;
applying, at the network administrator computer, the binary settings of the network topology and the binary setting of the remote computer to code a Remote Access Service (RAS) Application Programming Interface (API) to generate a configuration data binary file and prescribed RAS settings;
embedding, at the network administrator computer, the configuration data binary file as instructions in the RAS API;
replacing the empty binary file of the installer program with the configuration data binary file and generating the executable file using the configuration data binary file;
deploying the executable file comprising the configuration data binary file from the network to the remote computer;
executing the executable file on the remote computer to modify configuration settings of the remote computer by installing the prescribed RAS settings to edit RAS files of an operating system of the remote computer such that the remote computer is configured to establish a VPN connection to access the network;
configuring at the remote computer the RAS API as a connection application software;
configuring at the remote computer the executable file as a self-deleting file;
the step of executing the executable file further comprises:
executing on the remote computer the executable file such that the RAS API functions as the connection application software that issues instructions to the remote computer to establish the VPN connection with the network;
before establishing the VPN connection with a VPN server of the network, creating a connection profile that the RAS API is configured to provide to the operating system of the remote computer when the executable file is executed, wherein the connection profile contains information regarding at least one of an IP address, an address for a gateway, a DNS address, a WINS address, a DHCP address, and a NAT address;
coding WAN login credentials and automatically transmitting the WAN login credentials from the remote computer to the VPN server of the network when executing the executable file;
coding LAN login credentials and automatically transmitting the LAN login credentials from the remote computer to a domain controller of the network when executing the executable file;
wherein the WAN and the LAN login credentials are coded in a manner that the WAN and LAN login credentials are unknown to the user in order to prevent the user from becoming aware of the code of the WAN and LAN login credentials; and
automatically deleting the executable file from the remote computer after terminating the VPN connection.

2. The method of claim 1, wherein the executable file is e-mailed to the remote computer to be executed on the remote computer.

3. The method of claim 1, further comprising storing the executable file on a computer readable medium prior to execution of the executable file to provide the executable file to the remote computer for execution.

4. The method of claim 3, wherein the computer readable medium comprises a universal serial bus (USB) data storage peripheral having first and second storage areas, the first area being an electronically erasable read-only memory (EEPROM) storage area and the second storage area being a flash RAM storage area.

5. The method of claim 4, wherein the first storage area is a secure storage area which is accessible to a user of the USB data storage peripheral, and wherein the second storage area comprises a general storage area, which emulates a disk/hard drive, wherein the executable file is stored in the second storage area.

6. The method of claim 5, wherein an encryption key is stored in the first storage area, and wherein the executable file searches the first storage area for a prescribed authentication key before it can be executed by a user of the remote computer.

7. The method of claim 6, wherein the modified configuration settings of the remote computer comprise a setting that requires the remote computer to access the first storage area of the USB data storage peripheral prior to accessing the network.

8. The method of claim 6, wherein the remote computer cannot access the network if the encryption key within the first storage area cannot be accessed by the remote computer.

9. The method of claim 1, wherein the configuration data binary file comprises at least one of an IP address of a router coupled to the network of computers, a gateway address of the router, at least one DNS address, and at least one WINS address.

10. The method of claim 9, wherein the configuration data binary file further comprises at least one login and password necessary for the remote computer to access the network of computers.

11. The method of claim 1, wherein the user data application is configured to run with at least one of a commercial database application, a commercial spreadsheet application, and a commercial word processor application.

12. The method of claim 1, wherein executing the executable file on the remote computer further comprises manipulating a RAS phonebook to modify registry entries of the remote computer.

13. A method of configuring a remote computer to access a network of computers, comprising:
accessing a database associated with a configuration program generator that runs on a network administrator computer of the network of computers, the database having networking information necessary for at least one remote computer to access the network of computers, wherein the network information includes a WAN profile for the network of computers, at least one DNS address for the network of computers, and at least one WINS address for the network of computers;
executing a software module from within the database, the software module configured to:

extract the networking information for a selected one of the at least one remote computer;

convert the extracted networking information to a binary code representing configuration settings for the selected one of the at least one remote computer;

apply the binary code of the at least one remote computer to code a Remote Access Service (RAS) Application Programming Interface (API) to generate a configuration data binary file and prescribed RAS settings;

embed the configuration data binary file as instructions in the RAS API;

generate an executable program file having the binary code embedded therein, the executable program file being configured to modify current configurations of the selected one of the at least one remote computer when executed by the remote computer; and provide the executable program file comprising the configuration data binary file from the network of the computers to the selected one of the at least one remote computer for execution;

executing the executable program file on the remote computer to modify the current configurations of the selected one of the at least one remote computer by installing prescribed Remote Access Service (RAS) settings to edit RAS files of an operating system of the selected one of the at least one remote computer such that the selected one of the at least one remote computer is configured to establish a VPN connection to access the network of the computers;

configuring, at the at least one remote computer, the RAS API as a connection application software;

configuring, at the at least one remote computer, the executable program file as a self-deleting file;

the step of executing the executable program file further comprises:

executing on the at least one remote computer the executable program file such that the RAS API functions as the connection application software that issues instructions to the at least one remote computer to establish the VPN connection with the network of the computers;

before establishing the VPN connection with a VPN server of the network of the computers, creating a connection profile that the RAS API is configured to provide to the operating system of the at least one remote computer when the executable program file is executed, wherein the connection profile contains information regarding at least one of an IP address, an address for a gateway, a DNS address, a WINS address, a DHCIP address, and a NAT address;

coding WAN login credentials and automatically transmitting the WAN login credentials from the at least one remote computer to the VPN server of the network of the computers when executing the executable program file;

coding LAN login credentials and automatically transmitting the LAN login credentials from the at least one remote computer to a domain controller of the network of the computers when executing the executable program file;

wherein the WAN and the LAN login credentials are coded in a manner that the WAN and LAN login credentials are unknown to the user in order to prevent the user from becoming aware of the code of the WAN and LAN login credentials; and automatically deleting the executable program file from the at least one remote computer after terminating the VPN connection.

14. The method of claim 13, wherein providing the executable program file comprises at least one of e-mailing the executable program file to the at least one remote computer, transferring the executable program file to a magnetic storage device, transferring the executable program file to an optical disc, and loading the executable program file onto a web site for download by the at least one remote computer.

15. The method of claim 1, further comprising:

creating a custom VPN connection software application based on the configuration data;

encrypting and embedding VPN login credentials into the custom VPN connection software application, wherein the VPN login credentials are encrypted and embedded in a manner that the VPN credentials are hidden and protected from the user in order to prevent the user from establishing the VPN connection using a different connection mechanism; and providing application-based VPN connections using the custom VPN connection software application, instead of user-based connections, to establish the VPN connection in order to protect and secure proprietary data of the network by preventing the remote computer from directly gaining access to resources and data of the network.

16. The method of claim 15, further comprising:

embedding the LAN login credentials into a connection software application;

configuring the connection software application to provide additional levels of access control to the VPN connection software application when the VPN connection is established, wherein the additional levels of access control restrict login attempts to connections that have been validated by the VPN server; and configuring the WAN credentials of the VPN login credentials to provide additional security measures during the VPN connection and to provide different access experiences on the network to different users accessing the network, wherein network access control tools manage the access experiences provided to the different users by the network.

17. The method of claim 16, wherein the custom VPN connection software application comprises at least one of a dialer, the executable file, and a combination of the dialer and the executable file, and the connection software application comprises the executable file built on the network administrator computer and configured to leverage the RAS API on the remote computer.

18. The method of claim 17, further comprising:

generating a binary data resource by attaching custom and encrypted data to generic executable code;

automating customization of the custom VPN connection software application by attaching the binary data resource to the executable file, wherein the binary data resource can be either:

attached within the executable file using Windows API; or provided in a separate file that is attached to the executable file such that the custom and encrypted data is completely separate from the generic executable code, and the custom and encrypted data is configured to be available to the generic executable code when required through calls to the Windows API;

including, in the custom VPN connection software application, a decrypting mechanism to decrypt the custom and encrypted data from the binary data resource; and embedding, using the network database, local and internal run-time user authentication mechanisms within the custom VPN connection software application to control access to the executable file and to prevent unauthorized access to the network.

19. The method of claim 1, wherein the network database comprises an administrative database;

configuring the administrative database to create and manage the RAS API configuration and a connection software by:

storing the connection profile for each remote computer accessing the network;

creating a custom VPN connection software application and a connection software application for each remote computer; and deploying the RAS API configuration and the connection software including the VPN connection software application and the connection software application from the network to each remote computer via at least one of e-mailing the VPN connection software application and the connection software application to the remote computer, transferring the VPN connection software application and the connection software application to a magnetic storage device, transferring the VPN connection software application and the connection software application to an optical disc, and loading the VPN connection software application and the connection software application onto a web site for download by the remote computer;

automatically configuring, using the administrative database, a VPN server of the network to accept connections initiated by the RAS API configuration and the connection software; and automatically configuring, using the administrative database, a LAN domain controller to accept connections initiated by the RAS API configuration and the connection software.

20. The method of claim 19, further comprising:

configuring the administrative database comprising at least one of the following properties:

having a web page based interface;

to provide an interface to an e-commerce website;

to be included as a component within a customer relationship management (CRM) system or a enterprise resource planning (ERP) system;

to support call-center oriented customer support data;

to disable any prior connections initiated by the RAS API configuration and the connection software to the VPN server or to the LAN domain controller; and to monitor and manage the connections of at least one of the VPN server and the LAN domain controller through a complete connection cycle while the remote computer accesses services and resources of the network.

\* \* \* \* \*